(12) United States Patent
Baker

(10) Patent No.: US 7,740,021 B2
(45) Date of Patent: Jun. 22, 2010

(54) METHODS AND APPARATUS FOR CLEANING SCREENS USED IN SOLID/LIQUID SEPARATIONS IN OILFIELD OPERATIONS

(75) Inventor: Jack D. Baker, Montgomery, TX (US)

(73) Assignee: RNG Oilfield Sales & Service, LLC, Montgomery, TX (US)

( * ) Notice: Subject to any disclaimer, the term of this patent is extended or adjusted under 35 U.S.C. 154(b) by 655 days.

(21) Appl. No.: 11/618,753

(22) Filed: Dec. 30, 2006

(65) Prior Publication Data

US 2007/0199882 A1 Aug. 30, 2007

Related U.S. Application Data

(60) Provisional application No. 60/766,914, filed on Feb. 17, 2006.

(51) Int. Cl.
*B08B 11/02* (2006.01)

(52) U.S. Cl. .................. 134/148; 134/133; 134/184; 134/198

(58) Field of Classification Search ............. 134/122 R, 134/198, 133, 148, 184
See application file for complete search history.

(56) References Cited

U.S. PATENT DOCUMENTS

| | | | | |
|---|---|---|---|---|
| 2,960,065 A * | 11/1960 | Way et al. | .................. | 118/315 |
| 3,099,276 A * | 7/1963 | Bergendahl | ................. | 134/107 |
| 3,580,261 A * | 5/1971 | Key | ........................ | 134/104.4 |
| 3,656,493 A | 4/1972 | Black et al. | | |
| 3,760,824 A | 9/1973 | Edwards et al. | | |
| 3,873,364 A * | 3/1975 | Smith | ......................... | 134/138 |
| 4,115,891 A * | 9/1978 | Wills | ............................. | 15/71 |
| 4,146,483 A | 3/1979 | Lee | | |
| 4,281,675 A | 8/1981 | Pure | | |
| 4,420,004 A | 12/1983 | Jensen | | |
| 4,886,081 A | 12/1989 | Blaul | | |
| 5,069,360 A * | 12/1991 | Dingler et al. | .............. | 220/501 |
| 5,143,102 A | 9/1992 | Blaul | | |
| 5,172,709 A | 12/1992 | Eckhardt et al. | | |
| 5,277,208 A | 1/1994 | Mansur | | |
| 5,400,812 A * | 3/1995 | MacFarlane | ................ | 134/152 |
| 5,572,760 A | 11/1996 | Patun | | |
| 5,601,659 A | 2/1997 | Rohrbacher | | |
| 5,614,031 A | 3/1997 | Cushing | | |
| 5,642,743 A | 7/1997 | Ranes | | |
| 5,701,821 A * | 12/1997 | Asai et al. | .................... | 101/424 |
| 5,919,358 A | 7/1999 | Williams | | |
| 5,954,070 A | 9/1999 | Abad et al. | | |
| 6,032,683 A | 3/2000 | Casey et al. | | |
| 6,102,054 A * | 8/2000 | Diaz | ........................ | 134/57 R |
| 6,402,855 B1 * | 6/2002 | Damron et al. | ............... | 134/10 |
| 2005/0005957 A1 | 1/2005 | Yamagata | | |

* cited by examiner

*Primary Examiner*—Michael Kornakov
*Assistant Examiner*—Natasha Campbell
(74) *Attorney, Agent, or Firm*—Jeffrey L. Wendt

(57) ABSTRACT

Methods, apparatus, and kits are described, one method embodiment comprising loading a solids-laden screen into a carriage of a washing enclosure, the solids-laden screen comprising a screen mesh partially obstructed with solids from a well drilling or work-over operation, and spraying a cleaning composition onto first and second sides of the screen while vibrating the screen. Apparatus and kits for practicing the methods are also described. This abstract allows a searcher or other reader to quickly ascertain the subject matter of the disclosure. It will not be used to interpret or limit the scope or meaning of the claims.

11 Claims, 5 Drawing Sheets

007,740,021 B2

METHODS AND APPARATUS FOR CLEANING SCREENS USED IN SOLID/LIQUID SEPARATIONS IN OILFIELD OPERATIONS

CROSS-REFERENCE TO RELATED APPLICATIONS

The present application claims priority under 35 U.S.C. §119(e) to U.S. Provisional Application Ser. No. 60/766,914, filed Feb. 17, 2006, which is incorporated by reference herein its entirety.

BACKGROUND OF THE INVENTION

1. Field of Invention

The present invention relates generally to the field of cleaning equipment used in oilfield operations, and more specifically to methods and apparatus for cleaning screens used in solid/liquid separations in oilfield operations.

2. Related Art

The need for solids control, such as in conjunction with the use of drilling mud during hydrocarbons well drilling, has long been known. Drilling mud, typically a mixture of clay and water and various additives, is pumped through a hollow drill string (pipe, drill collars, bit etc.) down into the well and ejected through holes in the drill bit. Among other functions the mud picks up cuttings, rock and other solids from the bottom of the well and carries these solids away from the bit upward and out of the well in a space between the well walls and the drill string. At the top of the well, the solids-laden mud is directed to the shale shaker, a device consisting essentially of a series of screens which catch and remove solids from the mud as the mud passes through the screens. Each screen is caused to vibrate by vibrating equipment (shale shakers), in such a manner as to create a longitudinal flow of trapped solids in either direction on the top surface of the screen for removal and disposal of the solids. This filtering, along with other cleaning processes allows the mud to be reused.

The fineness or coarseness (mesh size of the mesh of a screen may vary depending on such factors as flow rate and size of solids to be separated by the screen. During this process the openings in the screen mesh tend to plug or solids get trapped and the fluid components of the mud are restricted from passing through the screen, reducing the flow capacity of the screen.

Once solids are separated by the screens in the shale shaker, in accordance with the prior art, upon completion of drilling the well the screens are taken off of the shale shaker, washed and cleaned in an open environment, and prepared to be used on the next well, or the screens are discarded if there was damage to the screen mesh during prior drilling operations. A typical practice is to simply lean the screens against a railing or other support on a drilling rig or work-over rig and hydroblast the screens, perhaps with some cleaning agent, with the excess water and cleaning agent simply draining into the local environment. As will be noted, this practice may allow contaminants and potentially hazardous materials to enter the environment. In addition, since the water and cleaning agent are not recycled, the volume of water and any cleaning agent used is quite voluminous and undesirable.

It would be advantageous and an advance in the art of cleaning drill cuttings screens to eliminate or substantially reduce the amount of contaminants and potentially hazardous materials entering the environment during cleaning of such screens, and to reduce the amount of water and other cleaning agents used.

SUMMARY OF THE INVENTION

In accordance with the present invention, methods and apparatus for cleaning drill cutting screens are described that reduce or overcome limitations of previously known methods and apparatus used in cleaning screens used with drilling and work-over drilling wells for hydrocarbons and other substances, are presented. Methods and apparatus of the invention are designed to remove solids that maybe trapped or stuck in the wire mesh of a screen after being used on a project for drilling hydrocarbon wells. Through the teachings of the present invention, drilling and work-over rig operators will be able to reduce or eliminate contaminated solids and excessive water polluting the environment surrounding drilling or production projects. After this cleaning process, any holes that may have been made in the screens may be patched and the screens reused.

The methods and apparatus of the invention relate to cleaning of screens used to separate and control solids, such as screens used to remove solids from drilling mud used in drilling hydrocarbon wells; more specifically, the methods and apparatus of the invention will remove substantially all solids trapped, stuck or plugged in the open area of the screen thus substantially returning the screen to its original capacity (flow rate) rating. The inventive methods and apparatus comprise using high-pressure, low-volume spray nozzles mounted on the inside of a specially designed washing enclosure. Apparatus of the invention are designed to retain all of the cleaning fluid and solids from the cleaning process in a holding tank mounted below the washing enclosure. A pump which may be an explosion-proof pump, transfers the contaminated fluid to another holding tank for disposal, leaving the surrounding area where the screens are being cleaned on the drilling or work-over rig free of any contaminated liquids, solids, or hazardous waste. Thus, methods and apparatus of the invention should be more environmentally acceptable than previous methods and apparatus.

A first aspect of the invention is a method comprising:
(a) loading a solids-laden screen into a carriage of a washing enclosure, the solids-laden screen comprising a screen mesh partially obstructed with solids from a well drilling or work-over operation (in certain embodiments the washing enclosure may be a component of a drilling or work-over rig); and
(b) spray a cleaning composition onto at least one side of the of the screen while vibrating the screen.

Methods of the invention may include, but are not limited to, those wherein the vibrating of the screen is effected by vibrators mounted on the carriage. Other methods include those wherein the spraying is performed by one or more nozzles mounted inside the washing enclosure. Other method include those wherein the spraying is performed by a pressure washing wand inserted into a slot in a side of the washing enclosure, the slot forming a pattern to move the wand during cleaning of the screen. Other methods of the invention comprise collecting substantially all of the cleaning composition and removed solids in a vessel or tank mounted below the washing enclosure. Yet other methods of the invention include pumping out a portion of the collected cleaning composition and solids upon the level in the tank reaching a predetermined level, and methods including timing of the spraying of the cleaning composition on the screen, either the total spray time, or the time for spraying on each side of the screen. The first and second sides of the screen may be sprayed sequentially, at the same time, or for overlapping time periods. The spraying time, pressure, and volume of cleaning fluid sprayed by the nozzles may be automated and programmed into a computer. In certain embodiments, explosion-proof electric components may be used, such as explosion-proof motors, vibrators, switches, and timers for spray nozzles. The spray nozzles may be high-pressure, low-volume nozzles.

A second aspect of the invention are apparatus, one embodiment comprising:
(a) a washing enclosure having a screen entry and exit end, wherein the enclosure may be mounted on a rig in certain embodiments;
(b) a screen carriage inside of and supported by the washing enclosure;
(c) a plurality of spray nozzles mounted inside of the washing enclosure arranged to spray a cleaning composition (which may be water, an aqueous cleaning composition, or oil-based cleaning composition) toward a screen carried by the screen carriage; and
(d) one or more carriage vibrators mounted on the screen carriage.

Certain apparatus of the invention may include a tank or vessel mounted below the washing enclosure and able to receive used cleaning compositions and debris removed from the screens. As mentioned in relation to the methods of the invention, a pump, which may be explosion-proof, may be fluidly connected to the tank and may be controlled by an automatic level controlled sub-system, such as a float level controller, and may include a tank level indicator. Apparatus of the invention may include one or more control valves for allowing control of volume and/or pressure of cleaning or other fluids to enter the washing enclosure through the spray nozzles. Apparatus of the invention may include flexible entry doors that flex over and wipe the screen as it enters and exits the washing enclosure, and which may function to retain solids and cleaning compositions inside the washing enclosure during cleaning of the screen. As used herein the term "washing enclosure" means a box-like component dimensioned to receive a screen of the sizes typically used in drilling wells and in well workovers. As used herein the term "carriage" refers to a sub-unit within some embodiments of washing enclosure dimensioned and intended to support the screen in the washing enclosure. The carriage may include one or more braces through which the screen may be guided during loading of the screen into the apparatus, and the braces may include neoprene or other resilient contact surfaces so that the screen will not be damaged when sliding into the carriage. The carriage may comprise, among other features, one or more rollers on which an edge of the screen frame may ride. The rollers may be solid or resilient. As used herein the term "vibrator" refers to a component able to shake or otherwise uniformly or randomly move the screen carriage and thus help loosen debris, rocks, chips, and other matter from the screens during, between, and/or after spraying. The movement may be side to side (transverse), up and down, or any combination of movements able to help loosen debris from a screen.

Certain apparatus embodiments of the invention may comprise a hinged washing enclosure, where a hinge along a bottom edge of the apparatus allows the washing enclosure to open somewhat like a briefcase. In these embodiments, the ends of the unit will not have screen entry and exits, and rollers may or may not be present. Other embodiments may comprise separate entry and exit ends of the washing enclosure. In these embodiments, screens may be continuously or discontinuously fed in the entry end and exit the exit end. In yet other apparatus embodiments, a kit is provided comprising a washing enclosure having a slot in one side for insertion of a pressure washing wand.

Apparatus of the invention may take any one of a number of arrangements (series, parallel) and configurations (for example truck-mounted, rig-mounted, and the like). Two or more apparatus of the invention may be arranged in parallel or in series as desired by the operator. One apparatus of the invention may be of different size than that of a second or more apparatus of the invention. Apparatus and methods of the invention may be used in conjunction with previously known or future cleaning apparatus and methods, and may employ one or more cleaning compositions, such as water, foam, organic solvents and combinations thereof. Certain apparatus embodiments may have more than one carriage to allow cleaning compositions to contact portions of the screen during cleaning. Alternatively, apparatus of the invention may include carriages able to carry and process more than one screen at a time, and thus methods where more than one screen may be cleaned at a time are considered within the invention. The size, length, and shape of the carriage and washing enclosure, the number and location of spray nozzles, the time period of spraying of cleaning and/or rinsing compositions, the pressure and volume of spray, may all be controlled, and the rate of cleaning of the screens may be controlled, if desired.

The various aspects of the invention will become more apparent upon review of the brief description of the drawings, the detailed description of the invention, and the claims that follow.

BRIEF DESCRIPTION OF THE DRAWINGS

The manner in which the objectives of the invention and other desirable characteristics can be obtained is explained in the following description and attached drawings in which.

Figure 1:
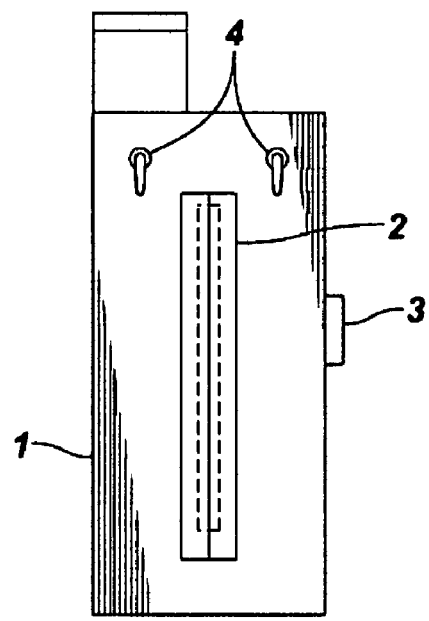
FIG. 1 is a schematic end elevation view of a prior art screen cleaning apparatus.

It is to be noted, however, that the appended drawings are highly schematic, not necessarily to scale, and illustrate only typical embodiments of this invention, and are therefore not to be considered limiting of its scope, for the invention may admit to other equally effective embodiments.

DETAILED DESCRIPTION

In the following description, numerous details are set forth to provide an understanding of the present invention. However, it will be understood by those skilled in the art that the present invention may be practiced without these details and the numerous variations or modifications from the described embodiments may be possible.

The invention describes methods and apparatus for cleaning screens, particularly in oilfield settings, such as Class 1, Division 1 environments, although the invention is not so limited. The methods and apparatus of the invention resolve problems of cleaning solids separating screens such as those used on drilling and work-over rigs. The inventive methods and apparatus will substantially reduce pollution due to cleaning the heavy-duty screens, which may 15-40 lbs. each, in an enclosure.

Apparatus of the invention include a washing enclosure that is dimensioned to receive solids separating screens used to separate and control solids such as screens to remove solids from drilling mud used in drilling hydrocarbon wells. The enclosure includes high-pressure spray nozzles that are positioned throughout the chamber, and vibration-producing motors are mounted on a carriage that supports the screen inside the washing enclosure. The vibration enhances the cleaning process. A screen to be cleaned is inserted into the enclosure through an opening, and into the carriage. In one embodiment, when the inventive apparatus is turned on, spray nozzles that are positioned on one side of the enclosure and the vibrating motors are activated, and a timer allows the screen to be washed on one side for 2 minutes. The spray nozzles on the opposite side of the chamber are then activated for another 2 minutes. In these embodiments, a total of 4 minutes of washing has occurred and 3-5 gallons of water has been utilized, using high-pressure/low-volume spray nozzles. A holding tank may be positioned near (and may be mounted on) the bottom of the washing enclosure; when the holding tank is full the contaminated liquid is automatically transferred by an explosion proof pump to an oil/water/solids separator that is furnished by the drilling or work-over contractor.

In certain embodiments, apparatus of the invention may be designed to be installed on drilling and work-over rigs in a Class 1, Division 1 hazardous area. In these embodiments it is necessary that motors, starters, vibrators and pumps are explosion-proof. The meaning of "explosion-proof" is well known in various industries and requires no further explanation to those skilled in the mechanical aspects of the hydrocarbon exploration, production, and processing industries. See, for example, API RP 500 Recommended Practice for Classification of Locations for Electrical Installations at Petroleum Facilities Classified as Class 1, Division 1 and Division 2. This recommended practice provides guidelines for determining the degree and extent of Class 1, Division 1 and Class 1, Division 2 at petroleum facilities, for the selection and installation of electrical equipment. Basic definitions provided in the National Electric Code have been followed in developing this document which applies to the classification of locations for both temporarily and permanently installed electrical equipment. RP 500 is intended to be applied where there may be a risk of ignition due to the presence of flammable gas or vapor, mixed with air under normal atmospheric conditions.

One advantage of methods and apparatus of the invention is the substantial reduction of pollution due to cleaning solids separating screens on drilling and work-over rigs. On a conventional on-shore drilling rig, drilling a well 15,000 feet deep, approximately 120 solids separating screens will be used. Conventional cleaning using a high-pressure washer in an open environment will use about 360-600 gallons of water that will become contaminated after cleaning the screens. Methods and apparatus of the invention will substantially reduce water consumption and eliminate the problem of cleaning solids separating screens in an open environment.

When applied to oilfield applications, these may include exploration, drilling, and production activities including producing water wherein oil or gaseous hydrocarbons are or were expected. As used herein the term "oilfield" includes land (on-shore) based (surface and sub-surface) and sub-seabed (off-shore) applications, and in certain instances seawater applications, such as when exploration, drilling, or production equipment is deployed through a water column. The term "oilfield" as used herein includes oil and gas reservoirs, and formations or portions of formations where oil and gas are expected but may ultimately only contain water, brine, or some other composition.

Referring now to the drawing figures, which admittedly are highly schematic and not to scale, and wherein the same reference numerals are used throughout except where noted, FIG. 1 illustrates an end elevation view of a first apparatus embodiment of the invention, including a box 1 defining an internal washing enclosure. Box 1 has four sides and an opening 2 in one end of the box where the solids filtering screen is inserted to be cleaned. An explosion-proof control panel 3 is mounted thereon, having an on/off switch, a timer and adjustment control for water disbursement. Right and left high pressure control valves 4 determine if the spray nozzles will operate simultaneously or individually.

Figure 2:
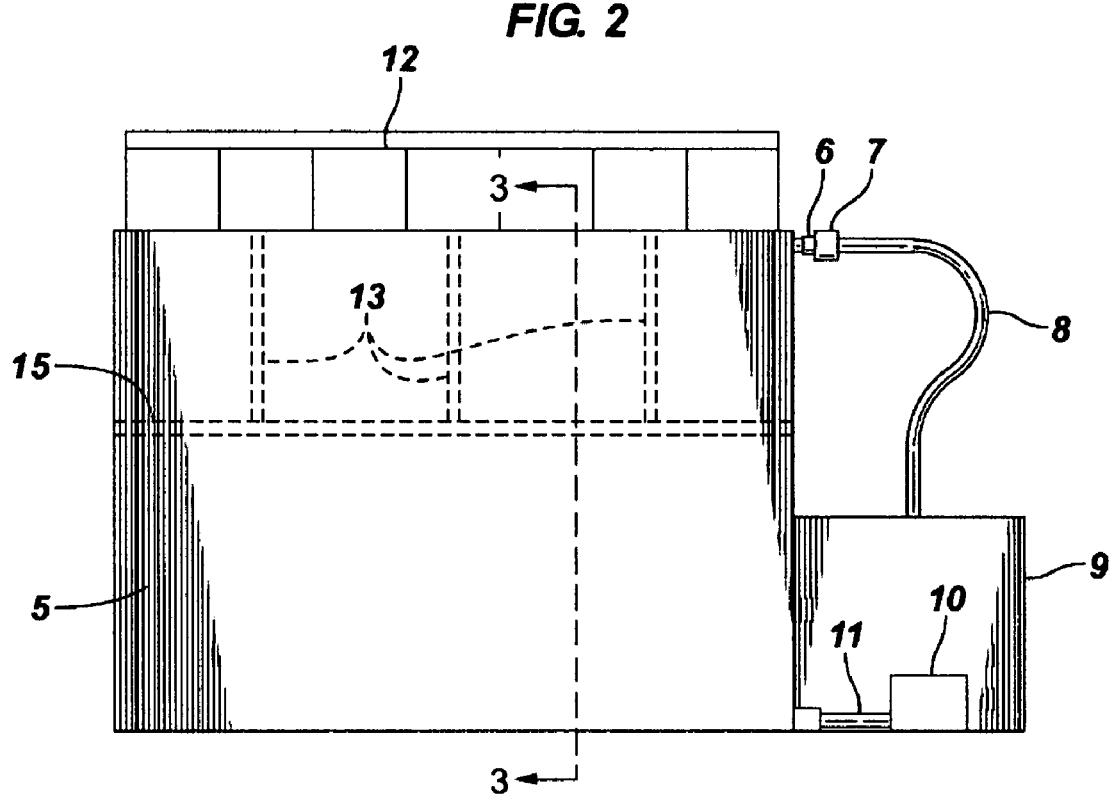
FIG. 2 is a schematic side elevation view of one embodiment of a vibrating screen cleaning apparatus of the invention.

FIG. 2 is a side elevation of the apparatus illustrated in FIG. 1. Illustrated in FIG. 2 is a long side panel 5, a high-pressure intake valve 6 that is connected to high-pressure tubing supplying nozzles inside the box. A high pressure regulator 7 is connected to high-pressure intake valve 6. High-pressure flex tubing 8 connects to a power source 9 that generates the flow of high-pressure water, foam or other cleaning composition, to the unit. An explosion-proof pump 10 transfers the contaminated liquid from a sump or bottom tank portion of the unit in this embodiment to an oil/water/solids separator (not illustrated) that may be supplied by the drilling contractor. A discharge line and valve 11 connects the sump to explosive-proof pump 10. The pump may be electrical explosion-proof or air activated. Optionally, the apparatus may include a work station 12 where material for patching the screen will be stored. Illustrated in phantom are braces 13 and neoprene insert 15, used to support the screen inside the washing enclosure.

Figure 3:
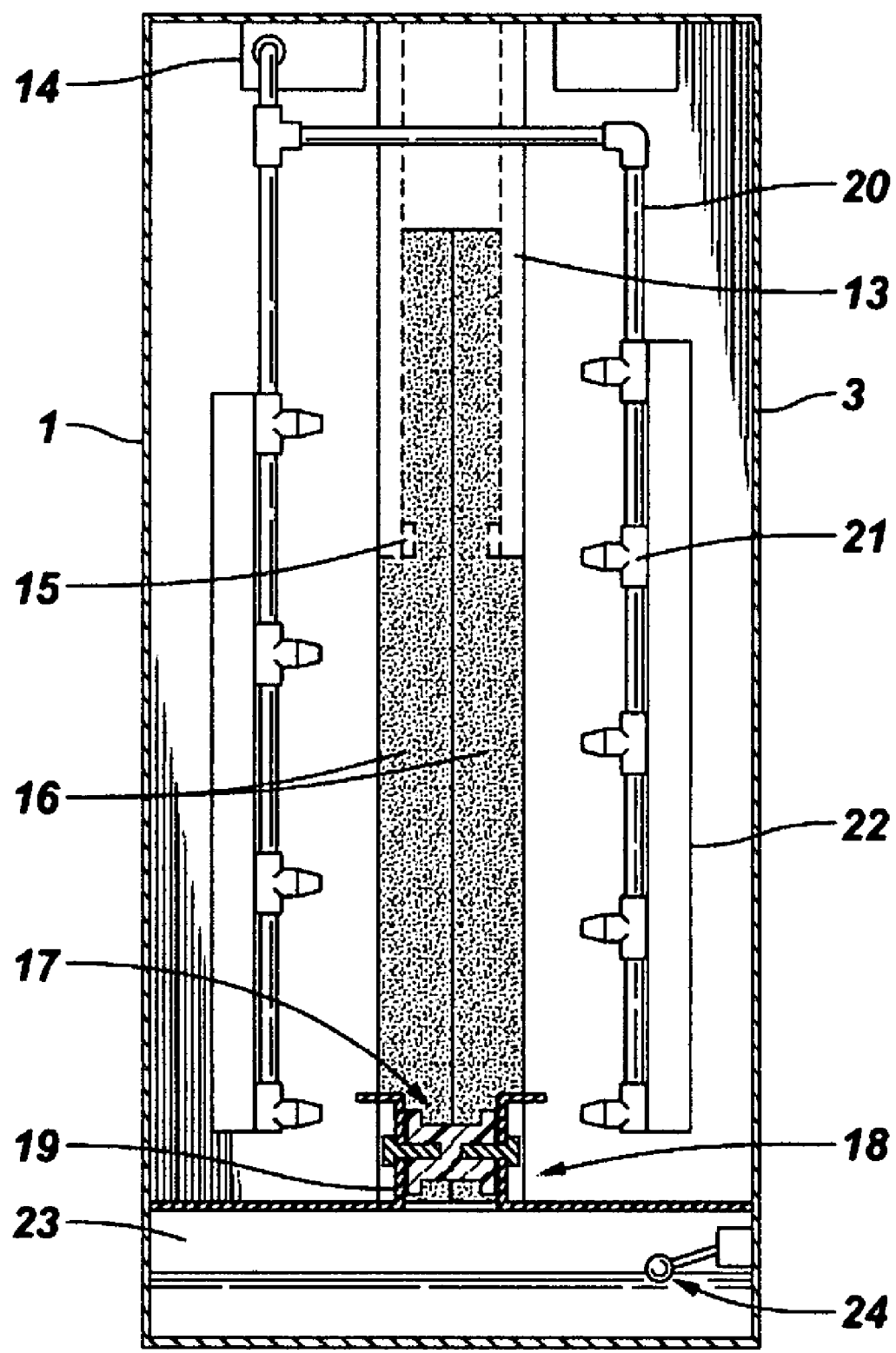
FIG. 3 is a cross-sectional view along section line 3-3 of FIG. 2.

FIG. 3 is a cross-sectional view, along line 3-3 of FIG. 2, partially in phantom, of the apparatus of FIGS. 1 and 2. Illustrated at 13 is the brace that supports the screen carriage. The brace may be stainless steel, but this is not required. Small vibrators 14 are mounted to the screen carriage to enhance the screen cleaning process, and neoprene inserts 15 are fitted into the screen carriage to insure that the screen will not be damaged when being inserted into the unit. Neoprene rubber flaps 16 are installed to prevent water from escaping from the unit when in operation, and upon extracting the screen the neoprene rubber flaps will wipe any existing contaminated water left on the filtering screen after the cleaning process. At the bottom of the screen carriage there are neoprene rollers 17 in this embodiment that ensure easy loading of the filter screen into the unit. Rollers 17 are supported by a brace 18 and support 19 that hold the rollers in the apparatus. High-pressure tubing 20 connects to the high-pressure intake valve 6, and 21 is a high-pressure connector that connects to the quick connect spray-nozzles, running vertical and horizontally on both the left and right side of the unit. A mounting support 22 for the high-pressure tubing and spray nozzles is illustrated. A wash water holding tank or sump 23 is illustrated at the bottom of the apparatus, a float 24 is mounted inside the holding tank to ensure that the tank never overflows.

Figure 4:
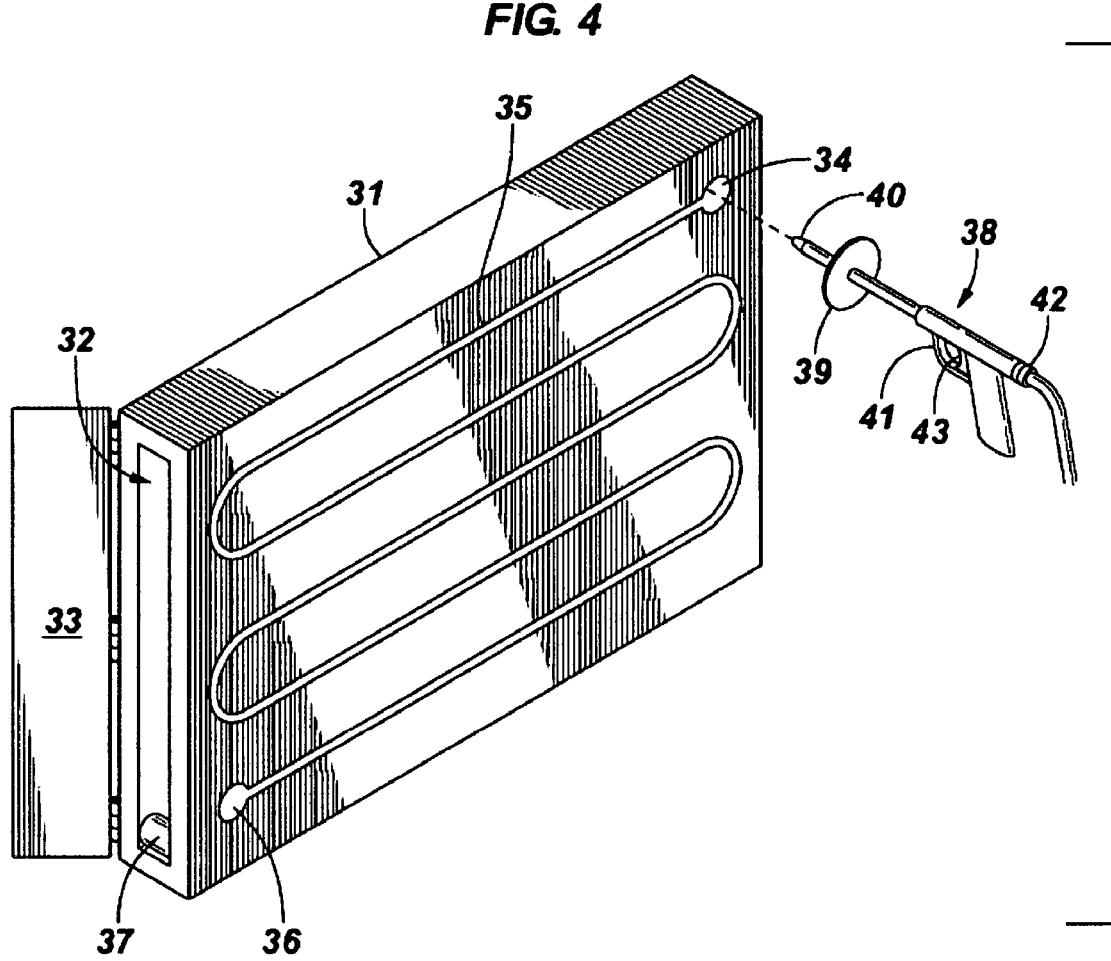
FIGS. 4-6 are perspective views of three other apparatus embodiments within the invention.

FIG. 4 illustrates schematically in perspective another apparatus embodiment within the invention, which may be more appropriately termed a kit. As illustrated in FIG. 4, the kit includes a washing enclosure 31, a screen entry and exit passageway 32, a door 33, a pressure washing wand entrance 34, and a pressure washing wand exit 36. Door 33 ensures that all splashing will be contained inside the washing enclosure during screen washing. Wand entrance 34 and exit 36 are connected by a slot 35 in one side of washing enclosure 31. It will be appreciated that entrance 34 and exit 36 may be reversed, and other paths for slot 35 may be envisioned. Rollers 37 are provide as in previous embodiments, as well as a sump, pump and level controls, all not shown for clarity. This embodiment may or may not include vibrators. A pressure washing wand 38 completes the kit, and includes an adjustable rubber spray stop and splash guard 39, which may be adjusted to allow a spray nozzle 40 to be at a consistent distance from the screen being cleaned when the nozzle is inserted into slot 35 of washing enclosure 31. Wand 38 may include, as well as a trigger 43 to activate spraying from the wand through nozzle 40. In this embodiment, internal spray nozzles and screen vibrators would not be necessary, but could be included in certain embodiments, if desired. In this embodiment, a screen to be cleaned is inserted into the unit and sprayed on one side using the designed path for the wand to follow, forcing some or all rocks and particles to be removed therefrom. The path insures that all areas of the screen are exposed to the spray from the wand's nozzle in one movement. This should eliminate or reduce excessive time to clean the screen, as well as greatly reduce contaminated liquid generation. If necessary, the screen may be removed and reinserted with the opposite side of the screen facing the spray nozzle of the pressure washing wand and the process repeated. Even if done twice, the time and contaminated liquid generation should be reduced compared with current practice.

Figure 5:
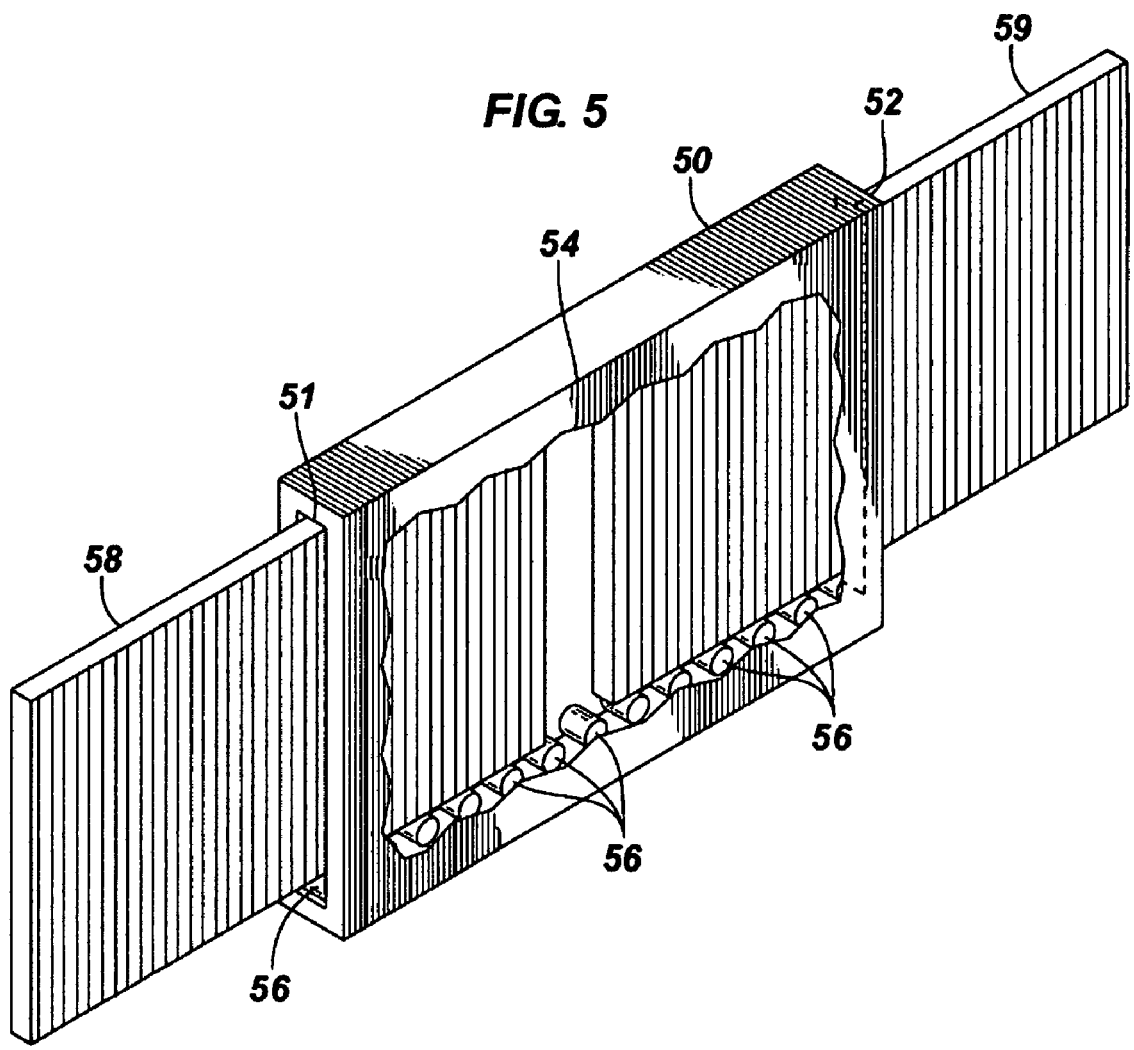

FIG. 5 illustrates in perspective view, partially in phantom, another screen washing apparatus embodiment within the invention, this embodiment including a washing enclosure 50 having all of the features of the washing enclosure of the first embodiment illustrated in FIGS. 1-3, but with some additional features. Washing enclosure 50 is illustrated with a portion of one side wall cut away, at 54, so that portions of screens 58 and 59 inside washing enclosure 50 may be viewed. As may be seen, in this embodiment there is an entry passage 51 and an exit passage 52, both of which may include flexible flaps (not shown) for keeping in wash composition during screen washing and, for the exit passage, wiping the screens as they pass by. In this embodiment, rather than inserting one screen through the entry passage and removing the cleaned screen through the same entrance passage, in this embodiment the screens pass through the washing apparatus 50, with the help of rollers 56, one or all of which may be automated, such as by being motor driven. The automated rollers allow the screens to move through the unit automatically. This provides operators the opportunity to clean a large number of screens in a minimal amount of time, and preserves all the benefits of the design illustrated in FIGS. 1-3. This embodiment may or may not include vibrators. As in previous embodiments, this embodiment may include a sump, a sump and level controls, all not shown for clarity.

Figure 6:
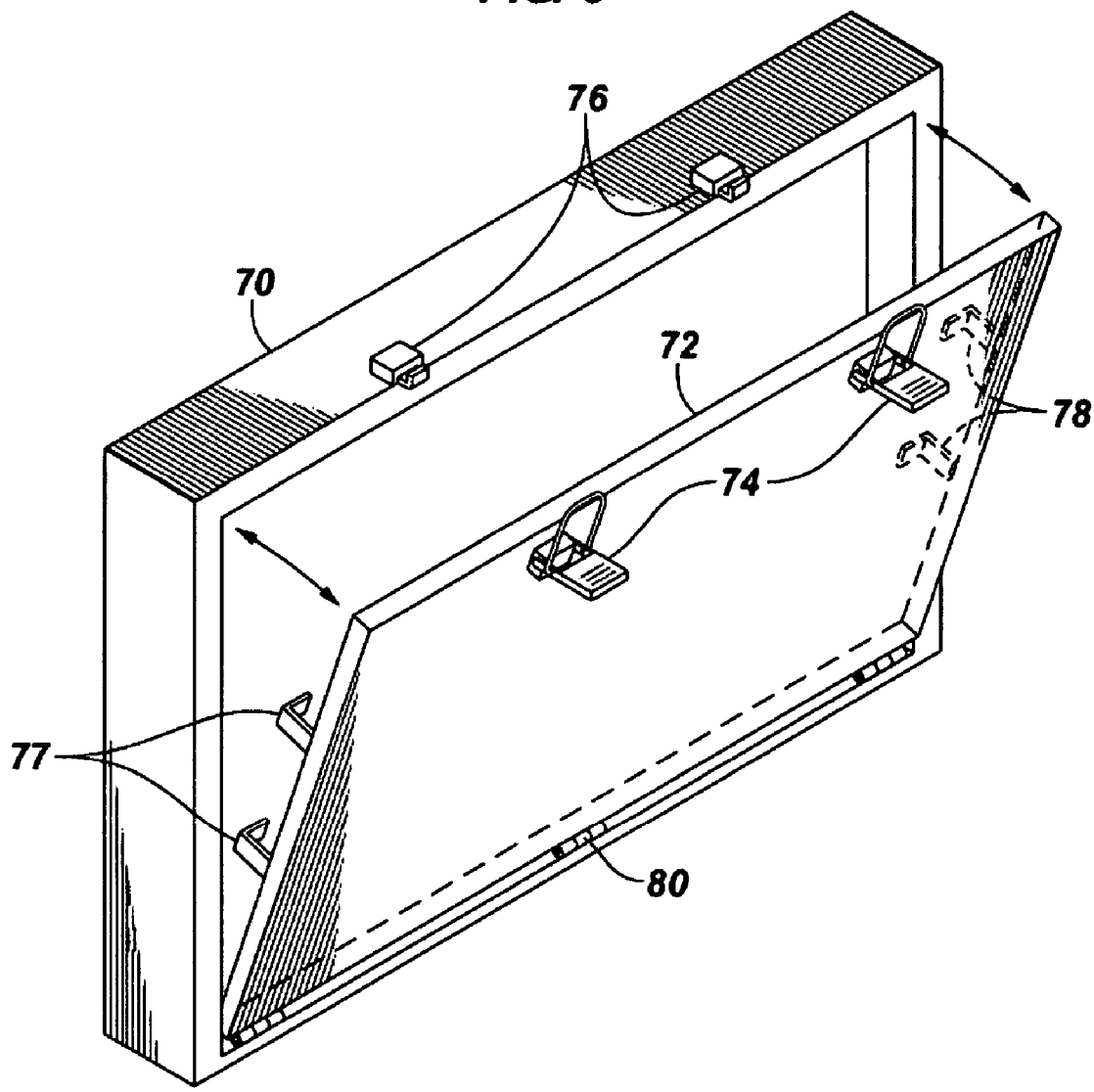

Another embodiment is illustrated in FIG. 6. In This embodiment, which may share features of other inventive apparatus embodiments, a washing enclosure 70 includes a door 72 which may open and close as indicated by the arrows. Door 72 may be latched closed by any convenient means. In the embodiment illustrated in FIG. 6, dual briefcase latches 74 are provided, which cooperate with dual latch receptors 76. Other latching or fastening devices may be used, such as hook and loop fasteners, belts with buckles, snaps, magnets, and the like. Screens to be cleaned are slid down into holders 77 and 78. Fours holders are illustrated, but more or less could be present. In this embodiment, spray nozzles are placed on the inside of washing enclosure 70 on the inside wall opposite door 72, or a slot such as depicted in FIG. 4 could be provided and the apparatus operated as a screen cleaning kit. After cleaning one side of the screen, it may be removed from the unit, turned over, and re-inserted for a second time. Rollers are not need in this embodiment, although they could be include on the door (for example, near the position shown for holders 77 and 78) to help with insertion and removal of the screens. This embodiment may or may not include vibrators. As in previous embodiments, this embodiment may include a sump, a pump and level controls all not shown for clarity.

Although only a few exemplary embodiments and features of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, no clauses are intended to be in the means-plus-function format allowed by 35 U.S.C. §112, paragraph 6 unless "means for " is explicitly recited together with an associated function. "Means for" clauses are intended to cover the structures described herein as performing the recited function and not only structural equivalents, but also equivalent structures.

What is claimed is:

1. An apparatus comprising:
   (a) a washing enclosure comprising a box-like component dimensioned to receive a screen of size used in drilling wells and in well workovers, the washing enclosure having a single screen entry and exit;
   (b) a screen carriage inside of and supported by the washing enclosure;
   (c) a plurality of spray nozzles mounted inside of the washing enclosure arranged to spray a cleaning composition toward a screen carried by the screen carriage; and
   (d) one or more carriage vibrators mounted on the screen carriage.

2. The apparatus of claim 1 comprising a tank or vessel mounted below the washing enclosure and dimensioned to receive used cleaning composition and debris removed from the screen.

3. The apparatus of claim 2 comprising a pump fluidly connected to the tank or vessel, the pump controlled by an automatic level controlled sub-system.

4. The apparatus of claim 1 comprising one or more control valves allowing control of volume and/or pressure of cleaning or other fluids to enter the washing enclosure through the spray nozzles.

5. The apparatus of claim 1 wherein the washing enclosure comprises one or more flexible entry doors dimensioned to flex around a screen as it enters and exits the washing enclosure and which function to retain solids and cleaning compositions inside the washing enclosure.

6. The apparatus of claim 1 wherein the carriage comprises one or more braces through which the screen may be guided, the braces comprising neoprene or other resilient contact surfaces so that the screen will not be damaged when sliding into the carriage.

7. The apparatus of claim 1 wherein the carriage comprises one or more rollers on which an edge of the screen frame rides.

8. The apparatus of claim 1 mounted on a support, wherein the support is selected from a drilling rig, a work-over rig, and a truck.

9. The apparatus of claim 1 wherein at least some of the plurality of spray nozzles are high-pressure, low-volume nozzles.

10. The apparatus of claim 3 wherein the pump is operated by an explosion-proof motor, the vibrators are explosion-proof, and the apparatus includes explosion-proof timers for the spray nozzles.

11. An apparatus comprising:
(a) a washing enclosure comprising a box-like component dimensioned to receive a screen of size used in drilling wells and in well workovers, the washing enclosure having separate screen entry and exits on opposite ends of the enclosure;
(b) a screen carriage inside of and supported by the washing enclosure;
(c) a plurality of spray nozzles mounted inside of the washing enclosure arranged to spray a cleaning composition toward a screen carried by the screen carriage;
(d) one or more carriage vibrators mounted on the screen carriage; and
(e) one or more automated rollers for moving the screen through the enclosure.

* * * * *